(12) United States Patent
McCann

(10) Patent No.: US 9,766,903 B2
(45) Date of Patent: Sep. 19, 2017

(54) INLINE RESPONSE TO NOTIFICATION MESSAGES

(75) Inventor: William Jon McCann, Baltimore, MD (US)

(73) Assignee: Red Hat, Inc., Raleigh, NC (US)

( * ) Notice: Subject to any disclaimer, the term of this patent is extended or adjusted under 35 U.S.C. 154(b) by 405 days.

(21) Appl. No.: 12/858,616

(22) Filed: Aug. 18, 2010

(65) Prior Publication Data

US 2012/0047460 A1     Feb. 23, 2012

(51) Int. Cl.
    *G06F 3/0481*     (2013.01)
    *H04L 12/58*     (2006.01)
    *G06F 9/44*     (2006.01)

(52) U.S. Cl.
    CPC ........ *G06F 9/4443* (2013.01); *G06F 3/04812* (2013.01); *H04L 12/587* (2013.01); *H04L 51/24* (2013.01)

(58) Field of Classification Search
None
See application file for complete search history.

(56) References Cited

U.S. PATENT DOCUMENTS

| | | | | |
|---|---|---|---|---|
| 7,155,729 | B1 * | 12/2006 | Andrew ................ | G06F 9/4446 715/700 |
| 2004/0098462 | A1 * | 5/2004 | Horvitz et al. ............... | 709/207 |
| 2004/0268263 | A1 * | 12/2004 | Van Dok et al. ............. | 715/733 |
| 2005/0114778 | A1 * | 5/2005 | Branson ................ | G06F 9/4446 715/711 |
| 2005/0120306 | A1 * | 6/2005 | Klassen ................ | G06F 3/0482 715/765 |
| 2006/0123353 | A1 * | 6/2006 | Matthews et al. ............ | 715/779 |
| 2007/0067798 | A1 * | 3/2007 | Wroblewski .......... | G06F 3/0346 725/37 |
| 2009/0132960 | A1 * | 5/2009 | Park .............................. | 715/810 |
| 2010/0115452 | A1 * | 5/2010 | Chabot et al. ................ | 715/779 |
| 2011/0145744 | A1 * | 6/2011 | Haynes et al. ................ | 715/766 |

OTHER PUBLICATIONS

Cardoza, P., "Using Microsoft Office Outlook 2003", 2004, Que Publishing, p. 27.*
Zhurakhinskaya, Marina, "Easy Breezy Beautiful GNOME Shell," The GNOME Journal, Nov. 6, 2009, downloaded from http://gnomejournal.org/article/85/easy-breezy-beautiful-gnome-shell, May 18, 2010, 5 pages.

(Continued)

*Primary Examiner* — Stella Higgs
(74) *Attorney, Agent, or Firm* — Lowenstein Sandler LLP

(57) ABSTRACT

In response to a first message received at a desktop of a data processing system from a message source, at least a portion of the first message is displayed in an area along an edge of a desktop screen presented by the desktop. In response to a first signal indicating that a cursor has been positioned within a predetermined distance of the displayed first message, further detailed information of the first message is displayed by increasing size of the area towards the edge of the desktop screen in an animated fashion, including displaying an input field without launching a separate window or process to allow a user to respond to the first message. In response to a second message entered into the input field by the user, the desktop transmits the second message to the message source.

20 Claims, 13 Drawing Sheets

(56) References Cited

OTHER PUBLICATIONS

McCann, William et al., "GNOME Shell: A design for a personal integrated digital work environment," The GNOME Project, Jul. 5, 2009, downloaded from http://people.gnome.org/~mccann/shell/design/GNOME_Shell-20090705.pdf.

"Growl (Software)" from http://en.wikipedia.org/wiki/Growl_(software), 3 pages, Applicable Reference Dates Cited May 29, 2010; Jun. 8, 2010; Jun. 5, 2006; Aug. 9, 2006.

"NotigyOSD" Ubuntu Team Wiki, Canoncial Ltd., Apr. 24, 2010, downloaded from https://wiki.ubuntu.com/NotifyOSD?action=print, May 11, 2010, 54 pages.

\* cited by examiner

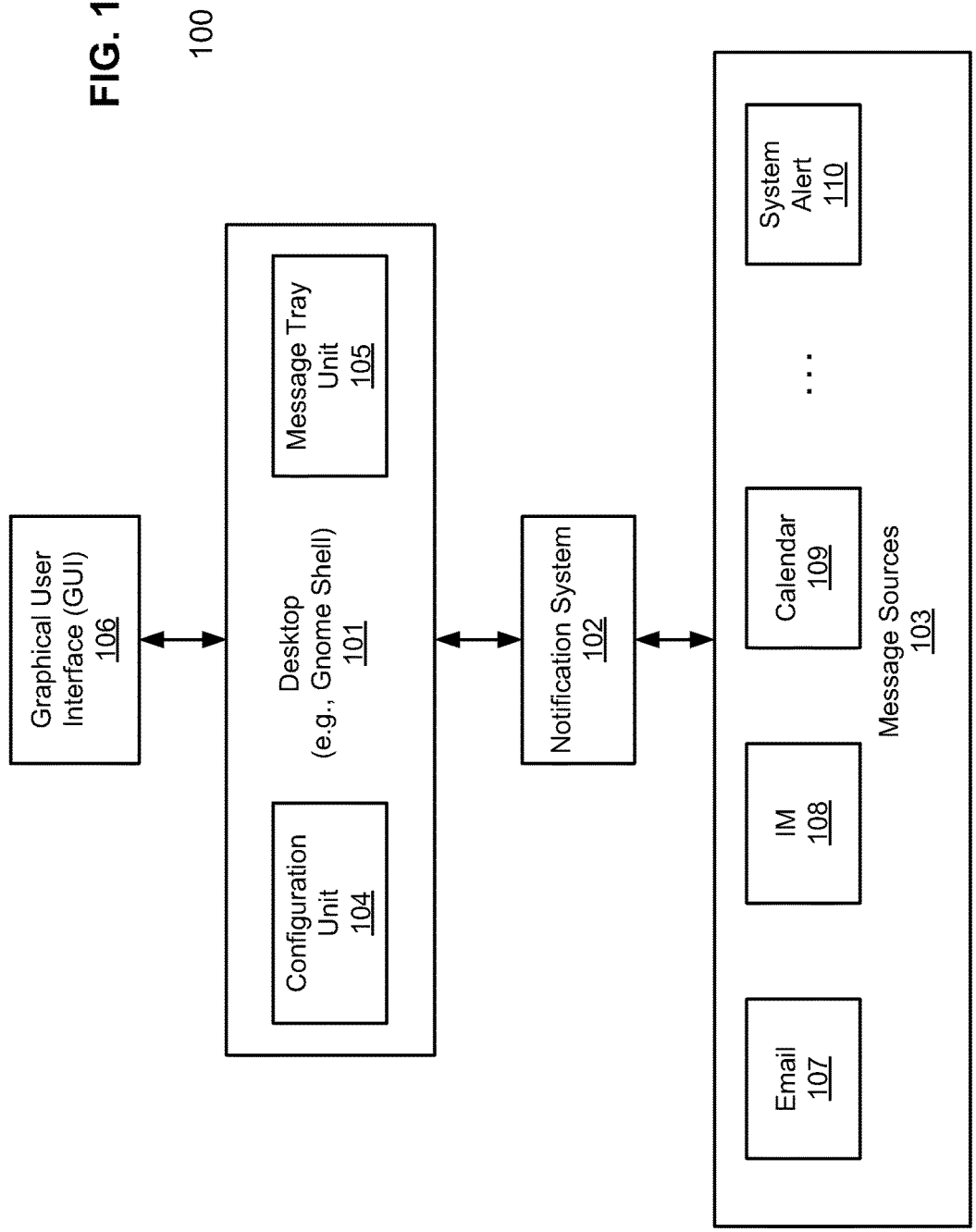

INLINE RESPONSE TO NOTIFICATION MESSAGES

TECHNICAL FIELD

The present invention relates generally to a notification message mechanism. More particularly, this invention relates to a mechanism for inline response to notification messages in a data processing system.

BACKGROUND

Many operating systems (OSs) include a notification system to notify a user that a new message has been received or a system alert (e.g., low battery alert) has been issued. These messages usually are displayed in a pop-up bubble like window (usually near the system tray) to inform the user. Such an implementation may disrupt the user and force the user to go elsewhere (e.g., switching to another window or process) to respond.

Typically, when a message (e.g., email or IM message) is received, in order to respond to the message, an application associated with that message (e.g., email or IM application) has to be invoked. A separate window and/or a separate process have to be launched or utilized. As a result, the user has to switch from what (e.g., word processor) he/she is doing to another window and/or process to respond or view the entire message. Such a task switch is relatively expensive in terms of processing resources of a computer system.

BRIEF DESCRIPTION OF THE DRAWINGS

The present invention is illustrated by way of example and not limitation in the figures of the accompanying drawings in which like references indicate similar elements.

FIG. 1 is a block diagram illustrating a system handling notification messages according to one embodiment of the invention.

DETAILED DESCRIPTION

Figure 2A:
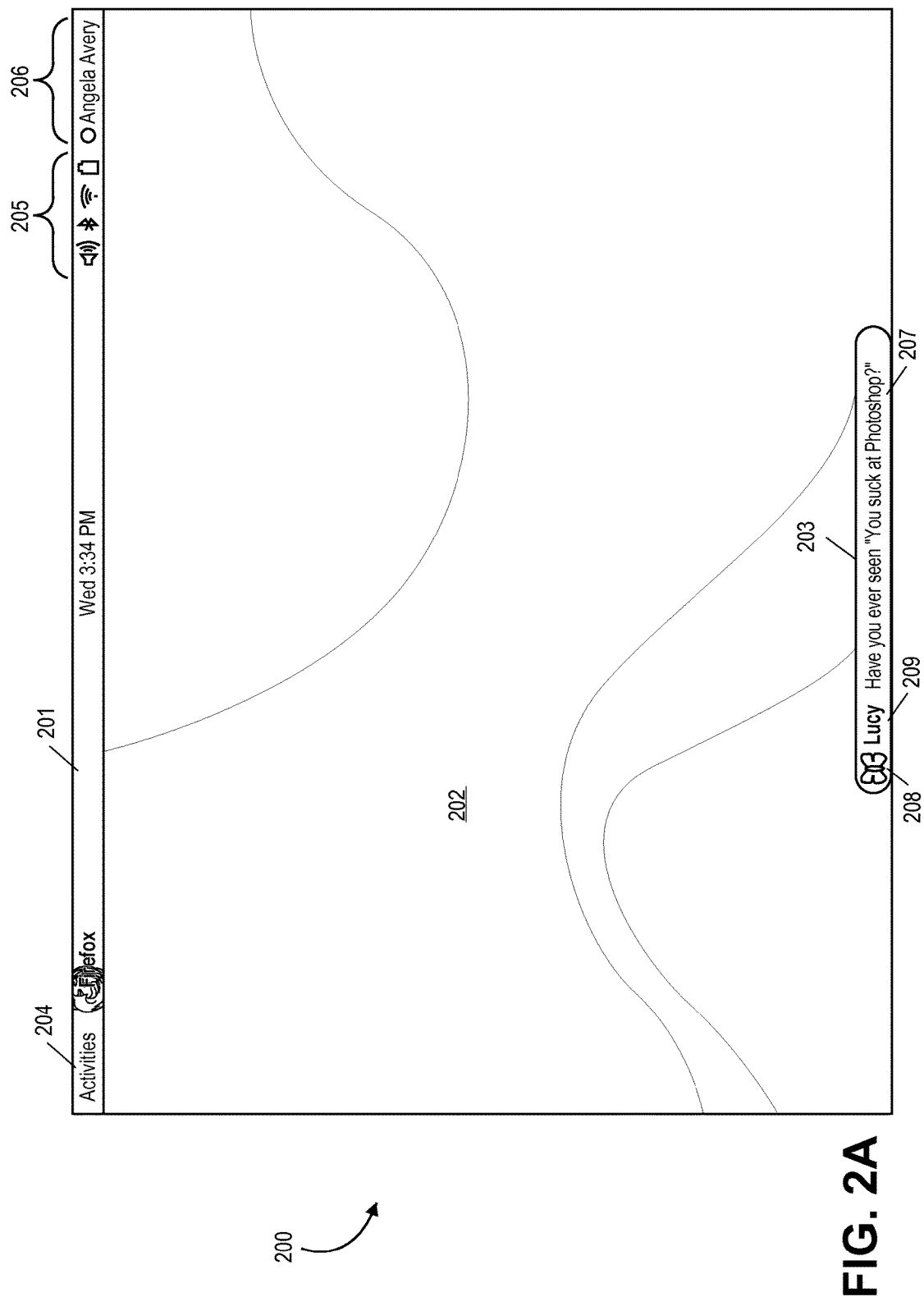
FIGS. 2A-2C are screenshots illustrating certain desktop GUIs for handling notification messages according to certain embodiments of the invention.

In the following description, numerous details are set forth to provide a more thorough explanation of the embodiments of the present invention. It will be apparent, however, to one skilled in the art, that embodiments of the present invention may be practiced without these specific details. In other instances, well-known structures and devices are shown in block diagram form, rather than in detail, in order to avoid obscuring embodiments of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification do not necessarily all refer to the same embodiment.

According to some embodiments, a desktop component of an operating system is configured to allow a user to respond to the notification messages in an inline manner. Thus, instead of disrupting a user and force the user to switch to another window or process, the user can respond immediately at the point of disruption on the desktop screen. As a result, the primary focus of the user can remain on the current task that the user is working on and the cost of switching different tasks in order to respond to a message is reduced.

FIG. 1 is a block diagram illustrating a system handling notification messages according to one embodiment of the invention. System 100 is hosted by a computing device such as a server computer, a personal computer, a mobile device, etc. Referring to FIG. 1, system 100 includes desktop 101 and notification system 102. Desktop 101 and notification system 102 may be part of core components of an operating system, such as, for example, LINUX, Windows™, and Mac OS™. Desktop 101 may be implemented as part of the Gnome shell of a LINUX OS. Notification system 102 may be implemented as part of desktop 101 or alternatively as a separate component. Notification system 102 is configured to receive messages from a variety of message sources 103, such as, for example, email 107, IM 108, calendar 109, and system alert 110, etc. In response to the messages, notification system 102 transmits a notification having at least a portion of the messages to desktop 101. The messages may be handled by message tray unit 105 and displayed in graphical user interface (GUI) 106 as part of a desktop screen, dependent upon a specific configuration associated with the particular type of messages, which may be user configurable by configuration unit 104. When a response is received from a user via GUI 106, the response is transmitted, for example, by message tray unit 105, to notification system 102, which in turns forwards the response to a proper message source.

In one embodiment, when a message is received from a message source, such as any of message sources 103, the message is transmitted by notification system 102 to message tray 105. The message is displayed by message tray 105 of desktop 101 along an edge of a desktop screen (e.g., bottom edge of the desktop screen) in GUI 106, such that the message can be easily read at a glance and just as easily ignored if the user is busy or decides not to act on it. The message may be displayed in an animated fashion by opening (e.g., sliding inwardly) the message tray from the edge of the desktop screen. The message may be displayed at a foreground of the desktop screen in a semi-transparent manner, such that the message will not unnecessarily block or obscure what the user is currently doing, but still be visible enough to notify the user.

According to one embodiment, initially at least a portion of the message may be displayed in a single line. When the user moves the cursor within a predetermined distance (e.g., predetermined proximity) of the displayed message or a message tray of the desktop screen, message tray unit 105 causes further detailed information of the message to be displayed, for example, by increasing (e.g., sliding) the message tray towards the center of the screen. In one embodiment, if the cursor remains within the predetermined proximity for a predetermined period of time (e.g., longer period of time), multiple messages previously exchanged with the message source (e.g., a portion of a message log associated with the message source) may be displayed, for example, in a chronological order. That is, in addition to displaying a newly arrived message as a single line message in message tray 203, each of the messages received is also queued in a message queue, and the messages and the responses are also recorded in a message log associated with the corresponding message source. According to one embodiment, when a cursor or pointer is positioned within the predetermined proximity of the message tray for a longer period of time, multiple messages and/or responses of the message log may be displayed, for example, to allow a user to browse or scroll through the message log via message tray 203.

In one embodiment, for certain types of messages, such as IM messages, an inline input field is also displayed near or next to the displayed message to allow the user to respond to the displayed message at the point in time on the desktop screen. Unlike conventional methods in which a separate window or process (e.g., IM application) is utilized, the input field is displayed as part of the desktop without using a separate window or process. That is, the user can directly type the response in the input field without having to switch to another window or process.

If the message is displayed for a predetermined period of time without user interaction (e.g., the cursor has not been moved into the predetermined proximity of the message tray), the message may be removed from the desktop screen, for example, by sliding the message and/or message tray off the edge of the desktop screen in an animated fashion. In one embodiment, when the message has been or is being removed from the desktop, an icon associated with that particular type of the message is displayed or appears, for example, at a message tray area of the desktop. The icon may be displayed in a particular style (e.g., different color or shape) to indicate whether there is at least one pending message to be viewed. The icon may also include information (e.g., a number) indicating the number of pending messages that have not been viewed. Subsequently, when the user activates or clicks the icon, at least one pending message and/or an input field may be displayed near the icon, without using a separate window or process.

Accordingly, embodiments of the invention allow exchanging messages while working on a task, exchanging messages related to the task, etc. Embodiments of the invention may be implemented as a part of mechanism for having a chat embedded in every program on a user computer.

Figure 2B:
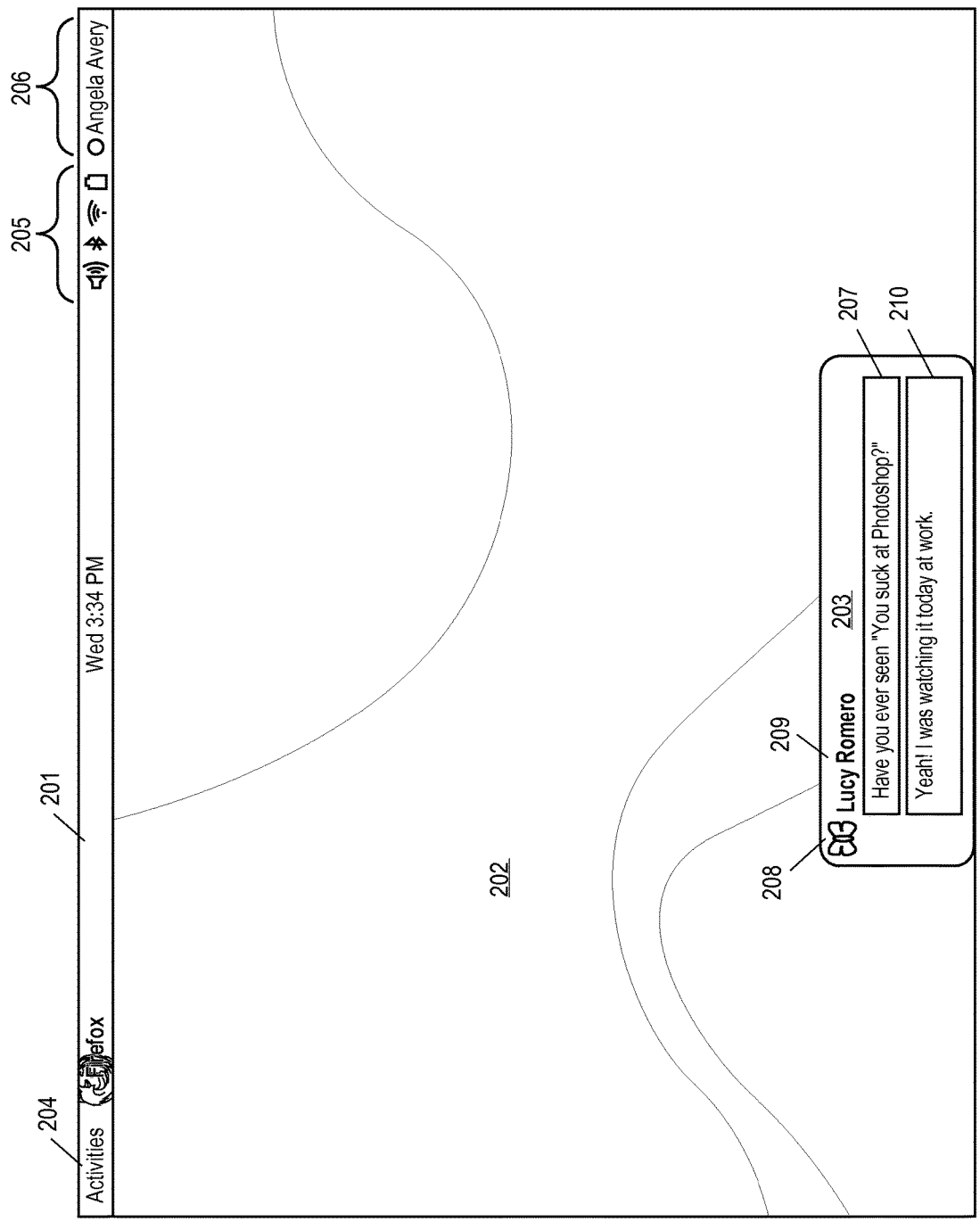
Figure 2C:
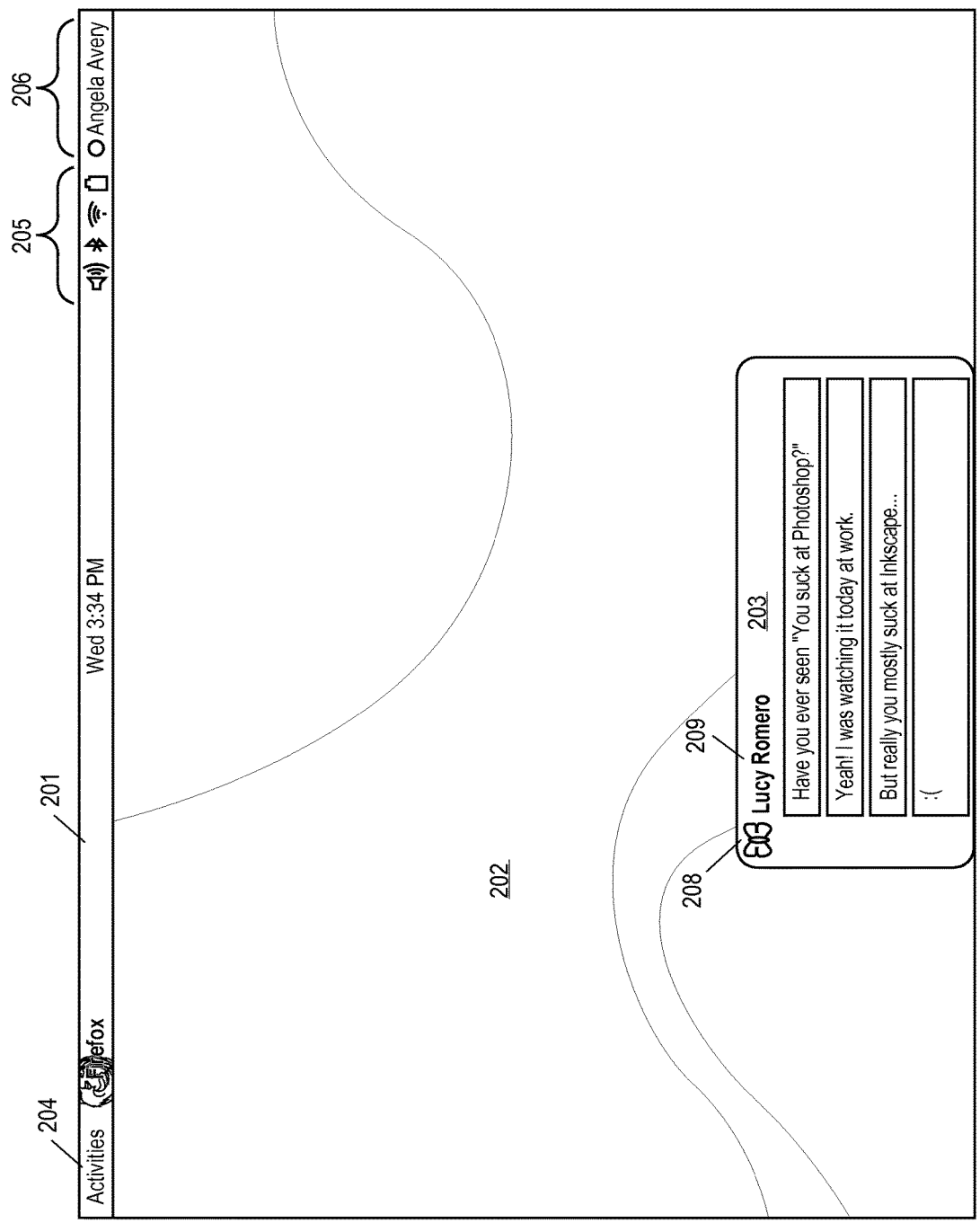

FIGS. 2A-2C are screenshots illustrating certain desktop GUIs for handling notification messages according to certain embodiments of the invention. For example, GUI 200 may be displayed as part of GUI 106 by desktop 101 of FIG. 1. Referring to FIGS. 2A-2C, GUI 200 includes menu bar 201, windowing area 202, and message tray area 203. Menu bar 201 includes activities item 204, system status area 205, and user status menu 206.

The area of activities item 204 is also referred to as a hot corner. Moving a pointer or cursor into this area may automatically activate activities item 204. Activities item 204, when triggered, may change the desktop into an activity overview mode, which dedicates a full screen to all the different ways in which a user can switch from doing one thing (e.g., an activity) to doing something else. It shows previews of all the windows the user has opened, the user's favorite and running applications, favorite directories and connected device collectively called "places", and recent documents, etc. It may integrate search and browse functionality if what the user wants is not immediately visible.

System status area 205 is a place where system status icons represent the status of system to the user. Examples of system status icons include indicators for audio volume, network connection, and battery power, etc. User menu item 206 can be used to provide access to personalization, customization, and status change options, etc. User menu item 206 may include a user identifier identifying the user and the user's current status, such as available, idle, busy, invisible, etc.

In one embodiment, the primary goal of message tray 203 is used to provide a user with enough information to quickly assess an event but limit the severity and duration of the preemption. Message tray can operate in one of four modes: 1) a hidden mode in which the message tray is hidden off the desktop screen; 2) a banner mode (as shown in FIGS. 2A-2C) in which a one-line summary of the notification or message is shown along with an icon; 3) a summary mode—a peripheral awareness (or low detail) mode showing an icon for each message source; and 4) a detail mode—an interactive mode showing more detail about each message source. The above operating modes may be user configurable.

In the examples of FIGS. 2A-2C, the message tray is operating in a notification mode. When a message is received from a message source such as IM, according to one embodiment, the message is displayed as a single line message in message tray 203. Message tray 203 may be displayed by sliding inwardly from an edge of the desktop screen 200 in order to display the single line message item, such that the message can be easily read at a glance and just as easily ignored if the user is busy or decides not to act on it. In this example, for the purpose of illustration, message tray 203 slides upwardly from the bottom edge of the desktop screen 200. However, it is not so limited; message tray 203 can slide in from any edge of the desktop screen 200. The message may be displayed at a foreground of the desktop screen in a semi-transparent manner, such that the message will not unnecessarily block or obscure what the user is currently doing, but still be visible enough to notify the user. In the notification mode, displayed message tray 203 may be roughly the height of one line of text with a fixed width determined by the size of the desktop screen, which may be user configurable. The message item being displayed includes an icon 208 (e.g., a graphical representation representing the message) and message synopsis 207 having a sender's identifier 209, as shown in FIG. 2A.

According to one embodiment, initially at least a portion of the message may be displayed in a single line. When the user moves the cursor within a predetermined proximity of the displayed message or message tray 203, further detailed information of the message may be displayed, for example, by increasing the height of message tray 203 further, as shown in FIG. 2B. In one embodiment, if the cursor remains within the predetermined proximity for a predetermined period of time (e.g., longer period of time), multiple messages previously exchanged with the message source may be displayed, for example, in a chronological order, as shown in FIG. 2C.

In one embodiment, for certain types of messages, such as IM messages as shown in FIG. 2B, input field 210 is also displayed near or next to the displayed message 207 to allow the user to respond to the displayed message 207 at the point in time on the desktop screen. Unlike convention methods in which a separate window or process (e.g., IM application) is utilized, input field 210 is displayed as part of the desktop without using a separate window or process. That is, the user can directly type the response in input field 210 without having to switch to another window or process. As the user keeps communicating with the sender, message tray 203 may slide in further to display a portion of message log having multiple messages as shown in FIG. 2C.

Figure 3A:
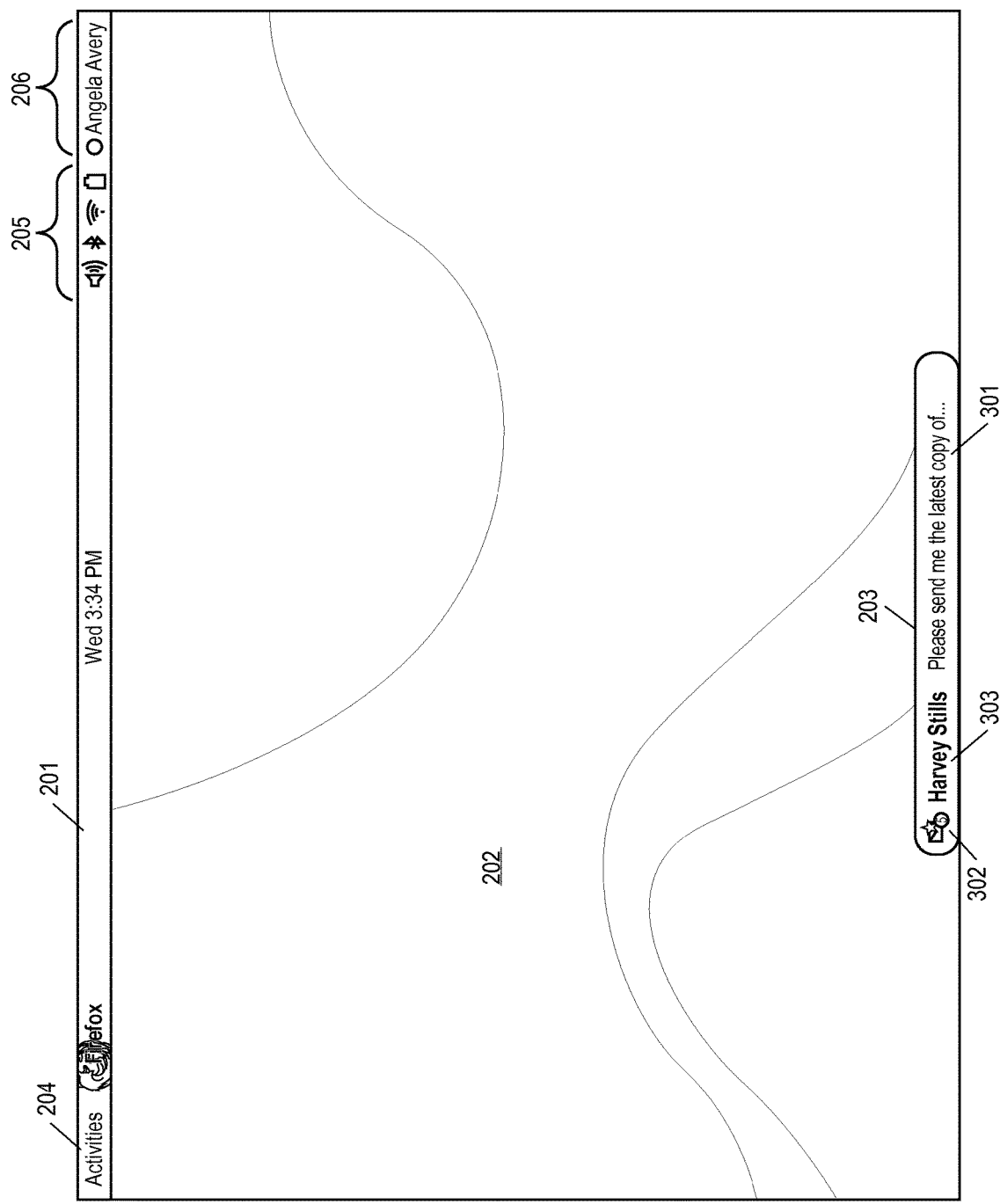
FIGS. 3A and 3B are screenshots illustrating a desktop GUI handling email messages according to one embodiment of the invention.
Figure 3B:
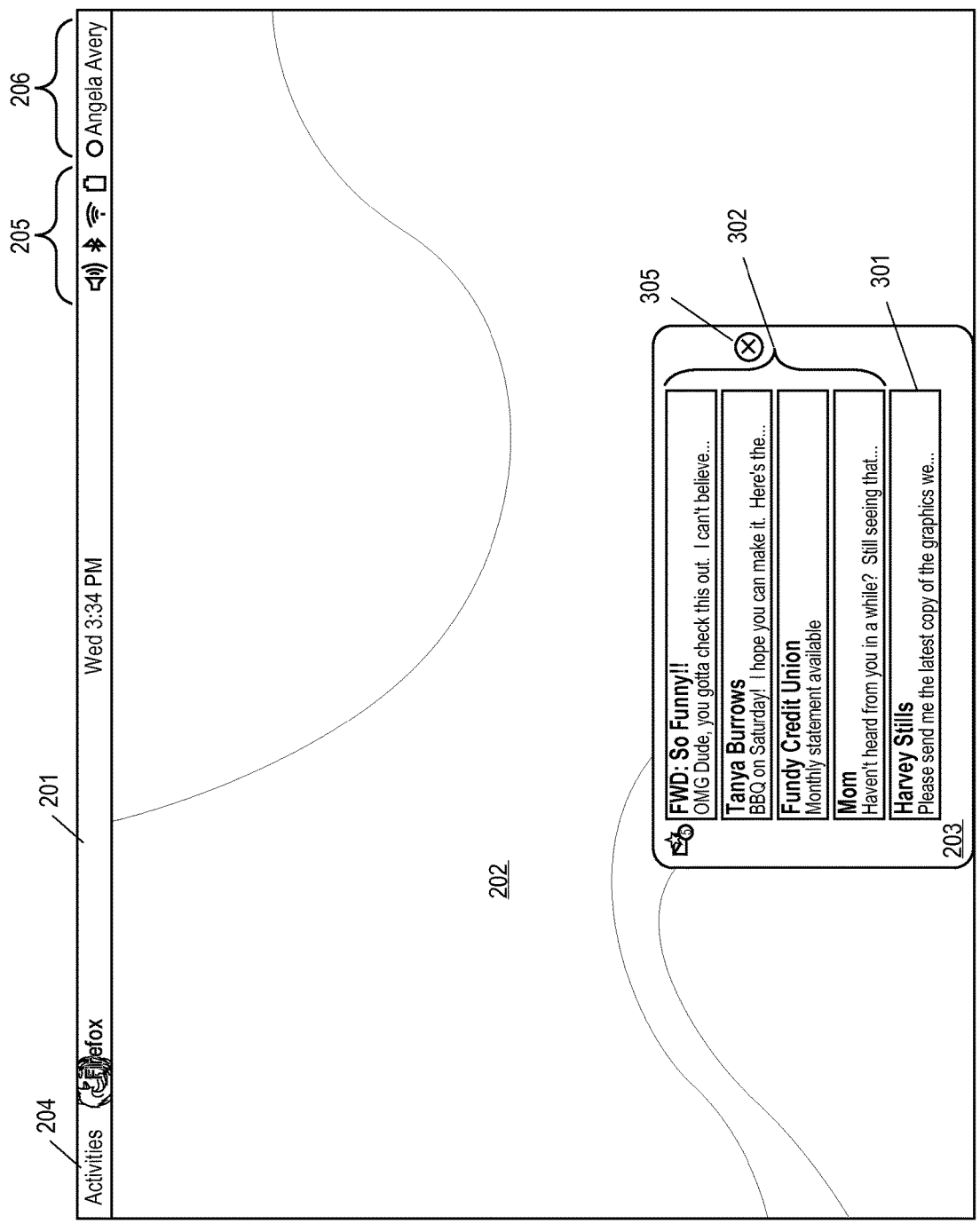

Note that the techniques described above can also be applied to other types of messages, such as, for example, email messages. FIGS. 3A and 3B are screenshots illustrating a desktop GUI handling email messages according to one embodiment of the invention. Referring to FIGS. 3A and 3B, when an email message is received, the email message is displayed in message tray 203 as a single line message having message synopsis 301, icon 302 associated with the email system, and sender identifier 303. Similarly, when a user moves the pointer or cursor within a predetermined proximity of message tray 203, message tray 203 may slide inwardly further to display more recently received email messages 304, one single line for each email message, as shown in FIG. 3B. In one embodiment, the user can activate or click any of the displayed email messages to access the details of the message, which may launch an email application. When the user moves the cursor directly over a particular email, according to one embodiment, one or more action buttons, such as a delete button 305, may be displayed next to the corresponding email message for a quick action (in this example, for deleting a particular email message). Alternatively, the user can directly respond (e.g., reply, forward, etc.) to any of the email messages via message tray 203.

Figure 4:
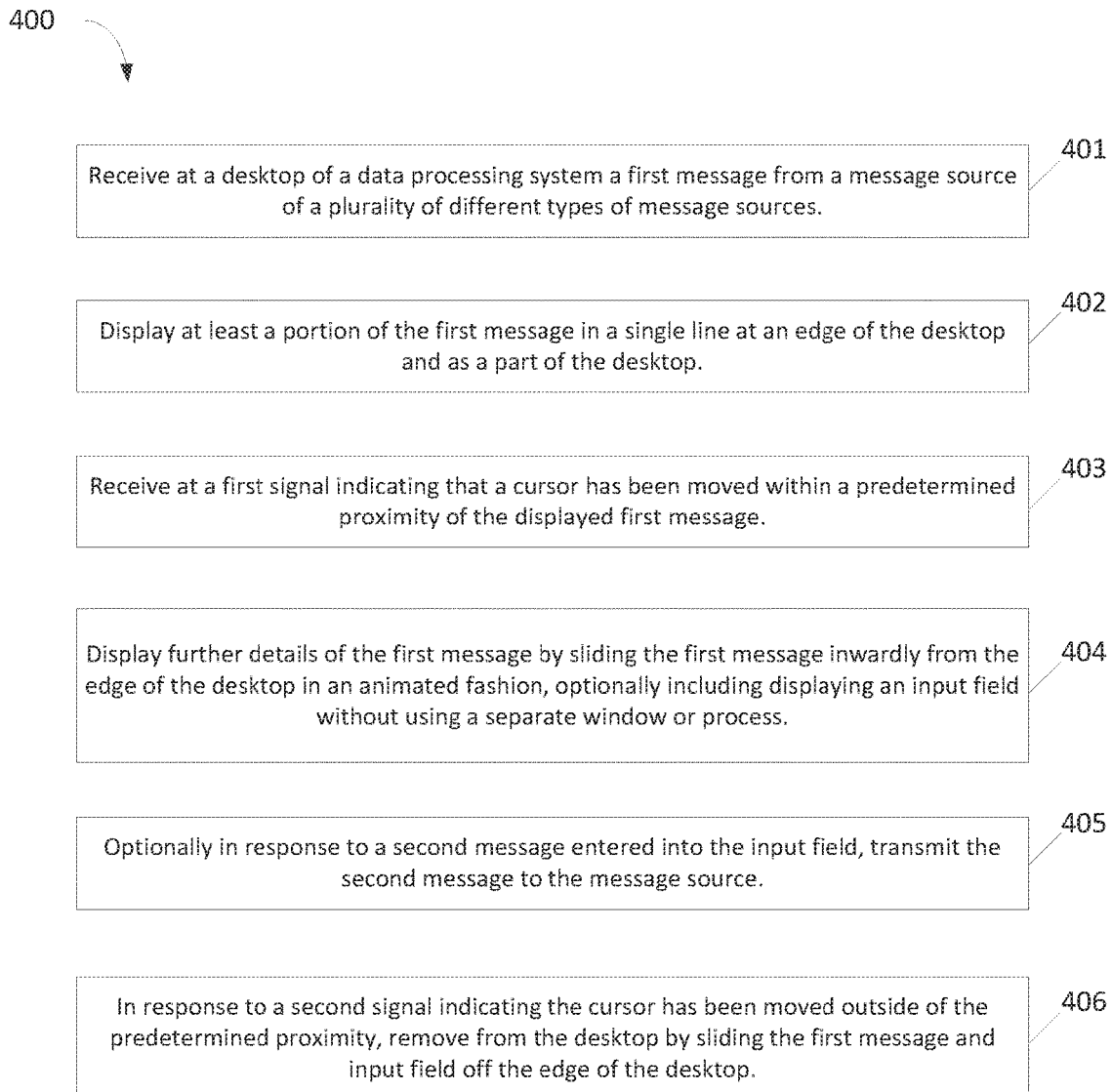
FIG. 4 is a flow diagram illustrating a method for handling notification messages according to one embodiment of the invention.

FIG. 4 is a flow diagram illustrating a method for handling notification messages according to one embodiment of the invention. For example, method 400 may be performed by desktop 101 of FIG. 1. Referring to FIG. 4, at block 401, a first message is received at a desktop of a data processing system from a message source. At block 402, at least a portion of the first message is displayed as a single line message in a message tray at an edge of a desktop screen as part of the desktop. At block 403, a first signal is received indicating that a pointer or cursor has been moved within a predetermined proximity of the displayed first message or the message tray. In response to the first signal, at block 404, the message tray slides in further from the edge of the desktop screen in an animated fashion to display further details of the first message. The message tray may further include an input field without using a separate window or process. At block 405, optionally in response to a second message entered in the input field, the second message is transmitted to the message source. In response to a second signal indicating that the cursor has been moved outside of the predetermined proximity, the first message and the input field are removed from the desktop screen by sliding the first message and the input field, and/or the message tray off the edge of the desktop screen.

Figure 5A:
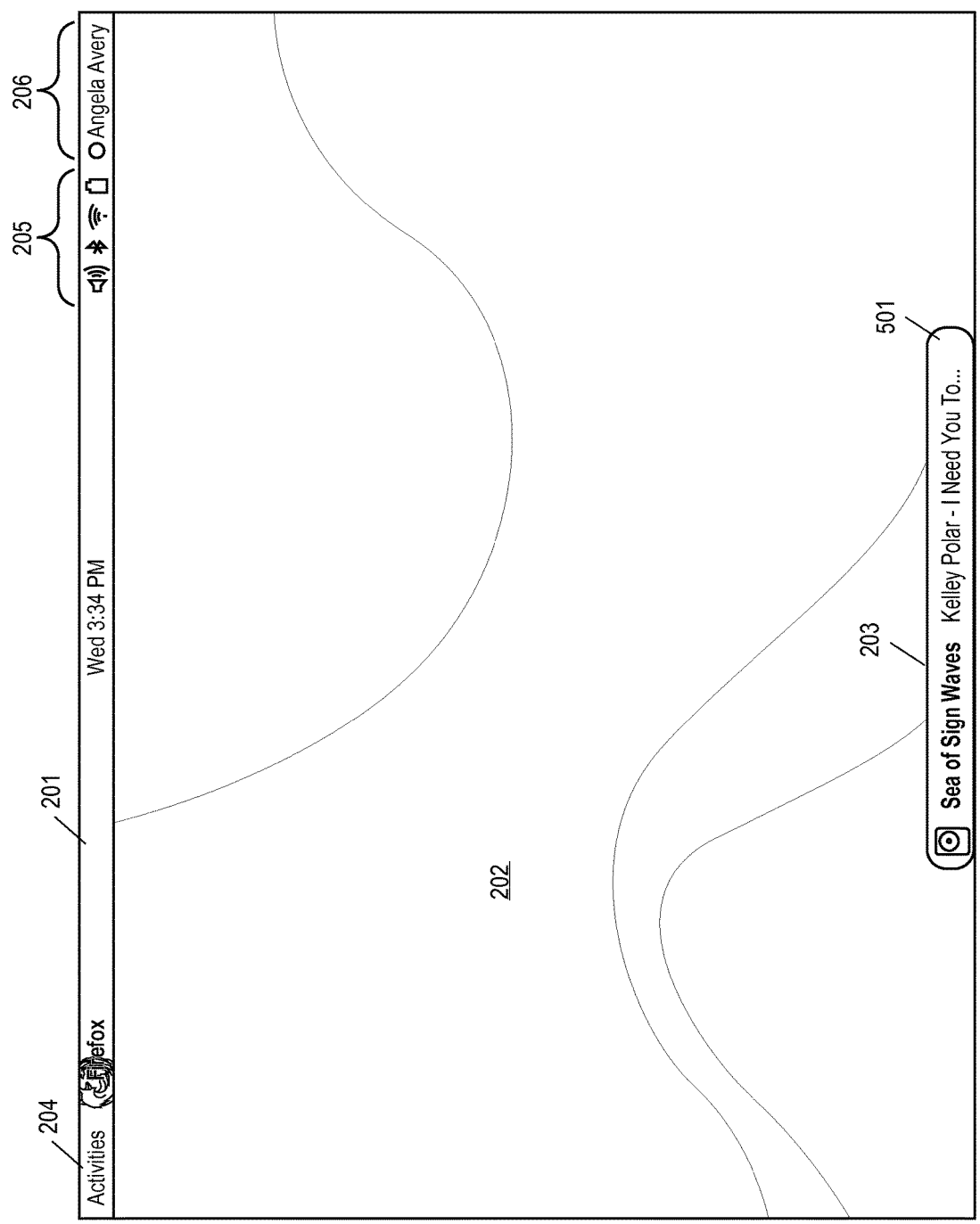
FIGS. 5A and 5B are screenshots illustrating a desktop GUI handling media messages according to one embodiment of the invention.
Figure 5B:
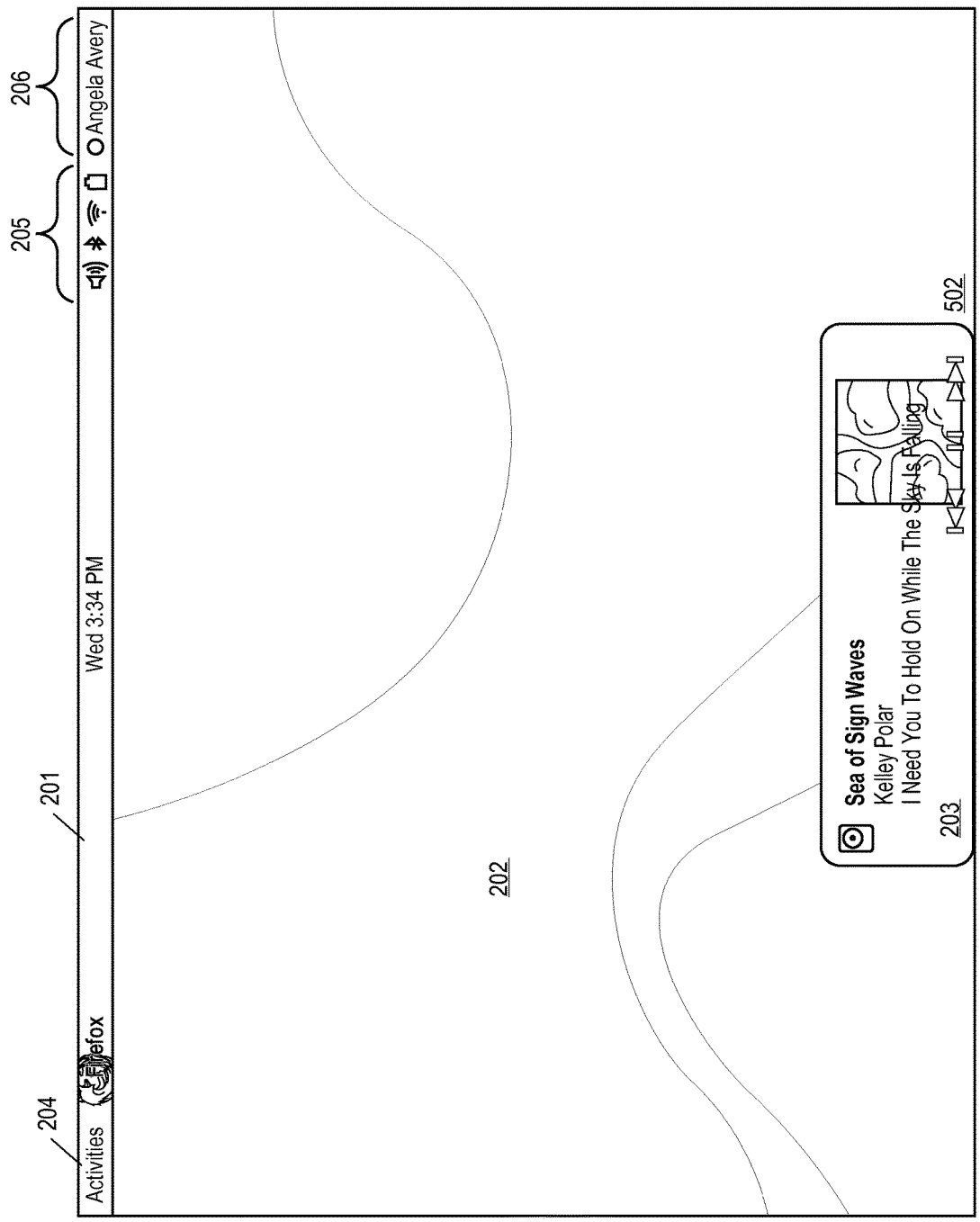
Figure 6:
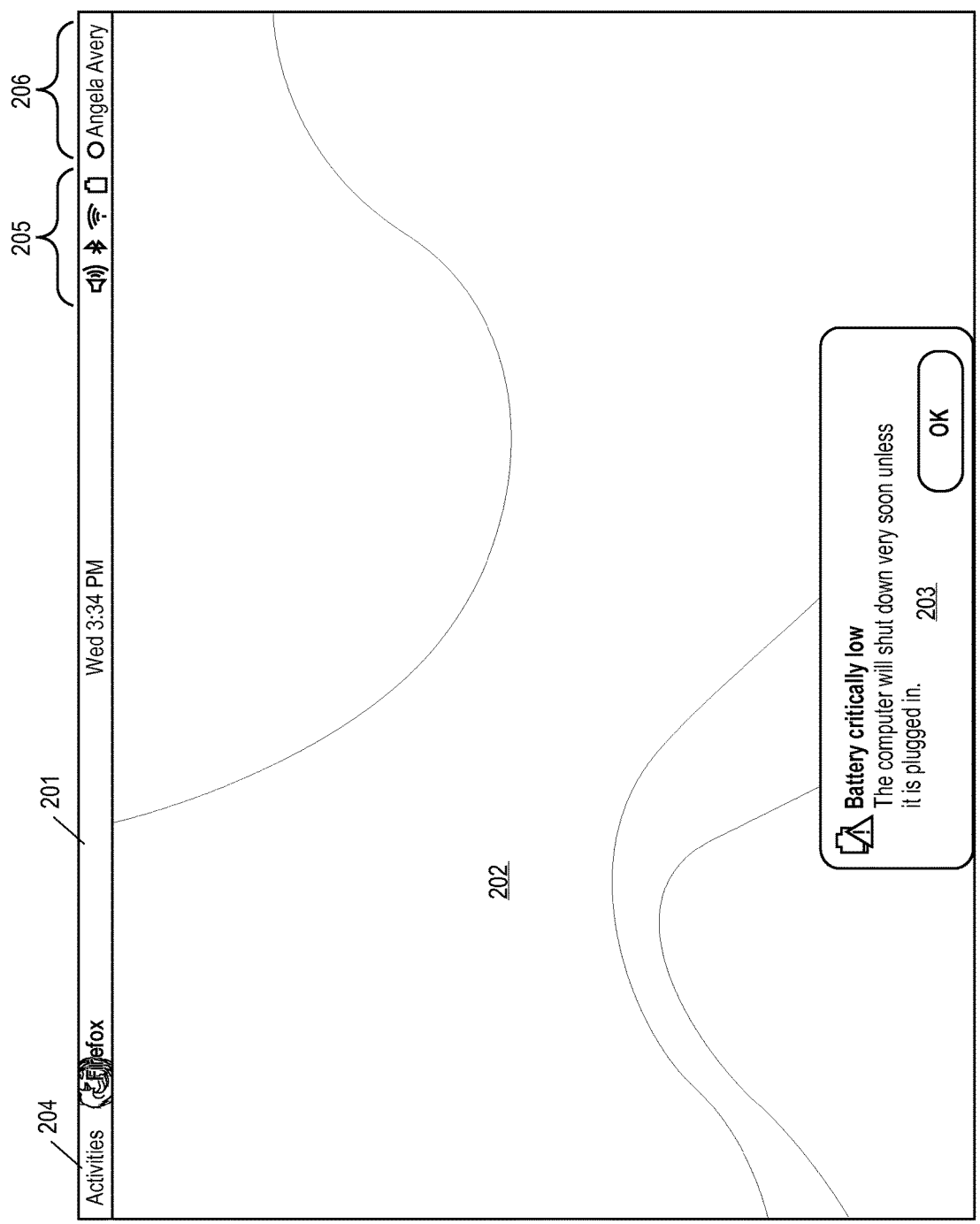
FIG. 6 is a screenshot illustrating a desktop GUI handling system alert messages according to one embodiment of the invention.

Note that the techniques described above can also be applied to a variety of notifications associated with a variety of applications without actually invoking the user interface of the applications (to avoid the unnecessary task switching). For example, the techniques described above can be applied to operations of a media player, such as, for example, an audio or video player, as shown in FIGS. 5A and 5B. Referring to FIG. 5A, message tray 203 can be used to display a brief summary 501 of currently being played media content by a media player, including for example, an icon associated with the type of media, a performer (e.g., singer) or author of the media content, a title of the media content, and a portion of the media content, etc. When a cursor is moved within a predetermined proximity of the message tray 203 or message 501, message tray 203 slides in further to display further details of the media content being played as shown in FIG. 5B. In addition, one or more action buttons 502 may also be displayed within message tray 203, such as, for example, a pause button, a fast forward button, and a fast rewind button, etc. Message tray 203 may also be utilized to display any system alert message, such as, for example, a low battery system alert, as shown in FIG. 6.

Figure 7A:
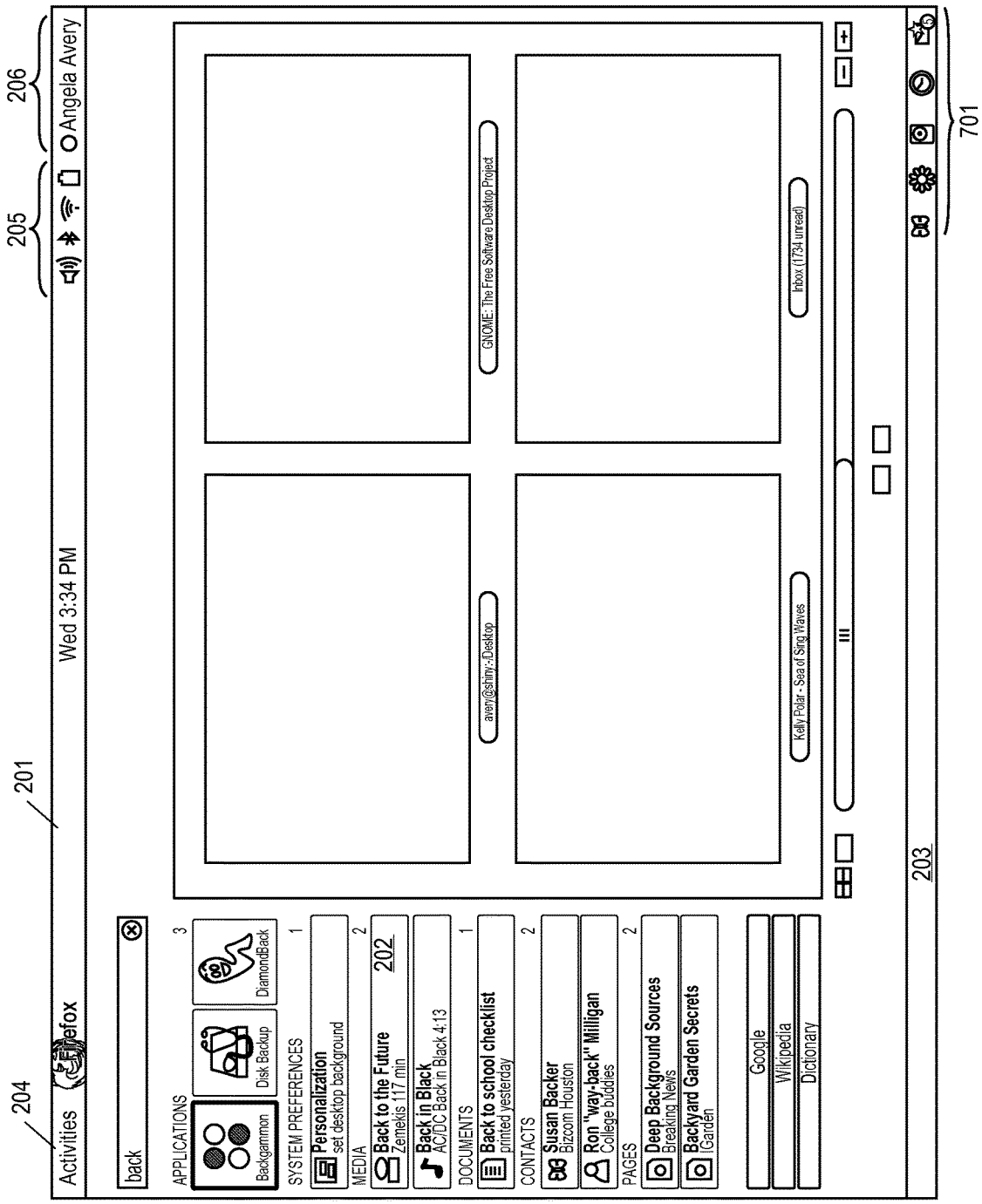
FIGS. 7A and 7B are screenshots illustrating a message tray operating in different modes according to some embodiments of the invention.
Figure 7B:
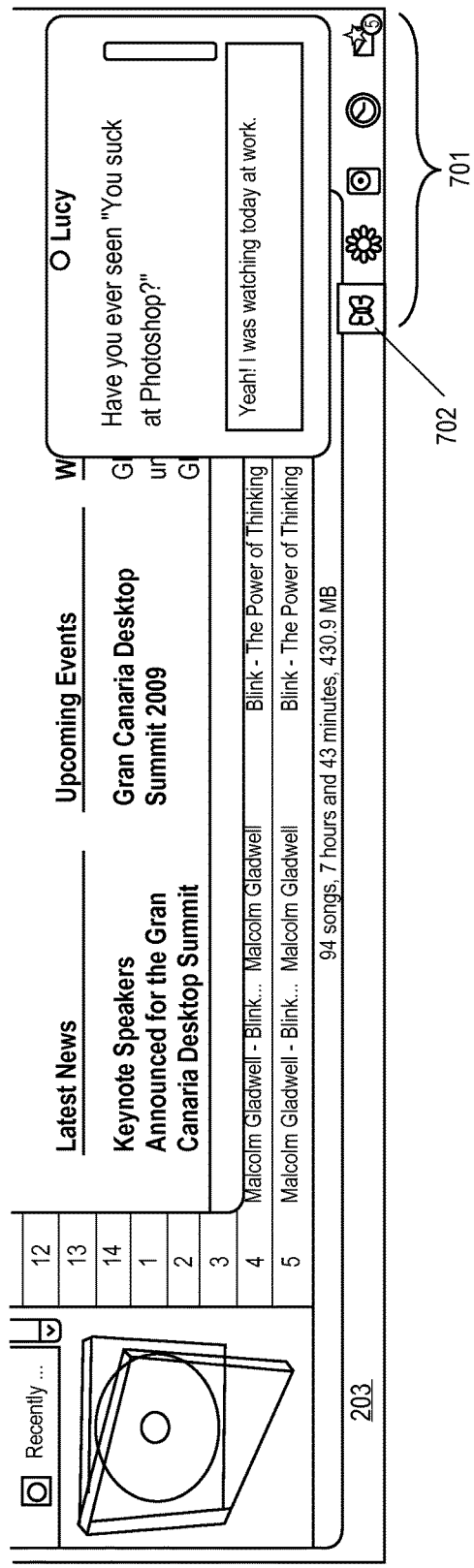

If the message is displayed for a predetermined period of time without user interaction, the message may be removed from the desktop screen, for example, by sliding the message off the edge of the desktop screen in an animated fashion. In one embodiment, when the message has been or is being removed from the desktop, an icon associated with that particular type of the message is displayed or appears, for example, at a message tray area of the desktop as one of icons 701 shown in FIG. 7A, where each icon represents a particular message source. In this situation, message tray 203 is operating in a summary mode. The icon may be displayed in a particular style (e.g., different color or shape) to indicate whether there is at least one pending message to be viewed. Subsequently, when the user activates or clicks the icon, in this example, icon 702, at least one pending message and/or an input field may be displayed near the icon as shown in FIG. 7B, without using a separate window or process as described above. In this situation, message tray 203 is operating in a detail mode.

Figure 8:
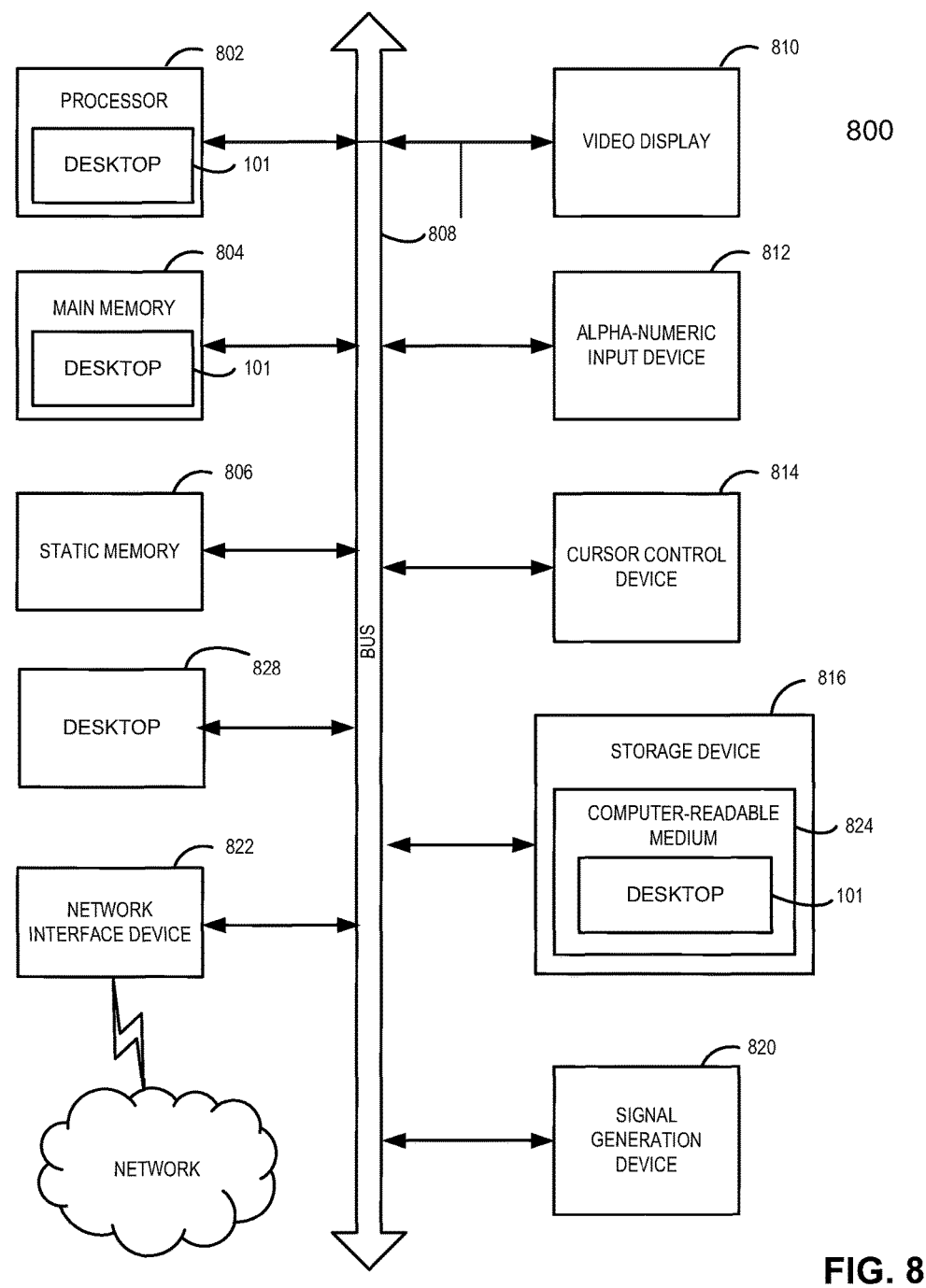
FIG. 8 is a block diagram illustrating a data processing system which may be used with an embodiment of the invention.

FIG. 8 illustrates a diagrammatic representation of a machine in the exemplary form of a computer system 800 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 800 includes a processor 802, a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a data storage device 816, which communicate with each other via a bus 808.

Processor 802 represents one or more general-purpose processors such as a microprocessor, a central processing unit, or the like. More particularly, the processor may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 802 may also be one or more special-purpose processors such as an application specific integrated circuit (ASIC), a field programmable gate array (FPGA), a digital signal processor (DSP), network processor, or the like. The processor 802 is configured to execute the instructions 101 for performing the operations and steps discussed herein.

The computer system 800 may further include a network interface device 822. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), and a signal generation device 820 (e.g., a speaker).

The data storage device 816 may include a computer-accessible storage medium 824 (also known as a machine-readable storage medium or a computer-readable medium) on which is stored one or more sets of instructions or software (e.g., desktop 101) embodying any one or more of the methodologies or functions described herein. The desktop 101 may also reside, completely or at least partially, within the main memory 804 and/or within the processor 802 during execution thereof by the computer system 800, the main memory 804 and the processor 802 also constituting machine-accessible storage media. The desktop 101 may further be transmitted or received over a network via the network interface device 822.

The computer-readable storage medium 824 may also be used to store the desktop 101 persistently. While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

The modules 828, components and other features described herein can be implemented as discrete hardware components or integrated in the functionality of hardware components such as ASICS, FPGAs, DSPs or similar devices. In addition, the modules 828 can be implemented as firmware or functional circuitry within hardware devices. Further, the modules 828 can be implemented in any combination hardware devices and software components.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
   executing, by a processor, a notification system as a component of an operating system (OS), the notification system is to receive a plurality of message types from a plurality of applications of different types executed by the processor and is to transmit notifications to a message tray on a graphical user interface (GUI) of the OS;
   receiving, by the processor, a first message type of the plurality of message types at the notification system, the first message type comprising a first email message generated by an email application of the plurality of applications;
   displaying, by the processor via the notification system in the GUI, a notification having a portion of information of the first email message without launching a separate process of the email application and without invoking a user interface of the email application, the notification displayed in a message tray of the GUI at a first position;

in response to a first signal indicating that a cursor is within a first distance of the notification:
 increasing, by the processor, a size of the message tray in the GUI; and
 displaying, by the processor via the notification system, further information of the first email message and an input field in the message tray having the increased size without launching the separate process of the email application and without invoking the user interface of the email application;

receiving a second message entered into the input field of the message tray having the increased size by the user;

forwarding, by the processing device via the notification system, the second message for transmission of the second message without invoking the user interface of the email application;

in response to a second signal indicating that the cursor is within the first distance of the message tray for a first predetermined time interval:
 displaying, by the processor in the message tray having the increased size, a plurality of other email messages provided to the notification system by the email application, wherein each of the plurality of other email messages are different from the first email message and the second message and are displayed in the message tray without launching the separate process of the email application and without invoking the user interface of the email application, and wherein the one or more other email messages comprise most recently received email messages of the email application;
 responsive to a third signal indicating that the cursor is directly over one of the email messages, displaying one or more action buttons corresponding to the one of the email messages, the one or more action buttons comprising at least a delete button; and
 responsive to a fourth signal indicating selection of the delete button, causing the email application to delete the one of the email messages; and in response to a fifth signal indicating that the cursor is beyond the first distance, decreasing, by the processor, the size of the message tray.

2. The method of claim 1, wherein the first email message and the input field are displayed in the GUI in a semi-transparent style on a foreground of the GUI.

3. The method of claim 1, further comprising:
removing the first email message from a display of the GUI when the cursor has not been detected within a second predetermined time interval; and
displaying an icon on the message tray of the GUI, wherein the icon is displayed in a style to indicate that there is a pending message to be viewed.

4. The method of claim 3, further comprising, in response to an activation of the icon, displaying the first email message within a second distance of the icon without using a separate window or process, including the input field to allow the user to respond to the first email message.

5. The method of claim 3, further comprising transmitting the pending message to a message source, wherein the message source is one of a plurality message sources, wherein for each of the message sources having the pending message to be viewed, an icon associated with the corresponding message source is displayed on the message tray, which when activated from the message tray, the corresponding pending message is displayed.

6. The method of claim 5, wherein the plurality of applications of different types comprise at least one of the email application, an instant messenger application, a calendar application, a media player application, or a system alert application.

7. The method of claim 1, wherein the first position comprises an edge portion of the GUI and a second position comprises the edge portion and a center portion of the GUI.

8. A non-transitory machine-readable storage medium having instructions stored therein, which when executed by a processor, cause the processor to:
execute a notification system as a component of an operating system (OS), the notification system is to receive a plurality of message types from a plurality of applications of different types executed by the processor and is to transmit notifications to a message tray on a graphical user interface (GUI) of the OS;

receive a first message type of the plurality of message types at the notification system, the first message type comprising a first email message generated by an email application of the plurality of applications;

display, via the notification system in the GUI, a notification having a portion of information of the first email message without launching a separate process of the email application and without invoking a user interface of the email application, the notification displayed in a message tray of the GUI at a first position;

in response to a first signal indicating that a cursor is within a first distance of the notification:
 increase a size of the message tray in the GUI; and
 display, via the notification system, further information of the first email message and an input field in the message tray having the increased size without launching the separate process of the email application and without invoking the user interface of the email application;

receive a second message entered into the input field of the message tray having the increased size by the user;

forward, via the notification system, the second message for transmission of the second message without invoking the user interface of the email application;

in response to a second signal indicating that the cursor is within the first distance of the message tray for a first predetermined time interval:
 display, in the message tray having the increased size, a plurality of other email messages provided to the notification system by the email application, wherein each of the plurality of other email messages are different from the first email message and the second message and are displayed in the message tray without launching the separate process of the email application and without invoking the user interface of the email application, and wherein the one or more other email messages comprise most recently received email messages of the email application;
 responsive to a third signal indicating that the cursor is directly over one of the email messages, display one or more action buttons corresponding to the one of the email messages, the one or more action buttons comprising at least a delete button; and
 responsive to a fourth signal indicating selection of the delete button, cause the email application to delete the one of the email messages; and in response to a fifth signal indicating that the cursor is beyond the first distance, decrease the size of the message tray.

9. The non-transitory machine-readable storage medium of claim 8, wherein the first email message and the input field are displayed in the GUI in a semi-transparent style on a foreground of the GUI.

10. The non-transitory machine-readable storage medium of claim 8, wherein the processor is further to:
remove the first email message from a display of the GUI when the cursor has not been detected within a second predetermined time interval; and
display an icon on message tray of the GUI, wherein the icon is displayed in a style to indicate that there is a pending message to be viewed.

11. The non-transitory machine-readable storage medium of claim 10, wherein the processor is further to, in response to an activation of the icon, display the first email message within a second distance of the icon without using a separate window or process, including the input field to allow the user to respond to the first email message.

12. The non-transitory machine-readable storage medium of claim 10, wherein the processor is further to transmit the pending message to a message source, wherein the message source is one of a plurality message sources, wherein for each of the message sources having the pending message to be viewed, an icon associated with the corresponding message source is displayed on the message tray, which when activated from the message tray, the corresponding pending message is displayed.

13. The non-transitory machine-readable storage medium of claim 12, wherein the plurality of applications of different types comprise at least one of the email application, an instant messenger application, a calendar application, a media player application, or a system alert application.

14. The non-transitory machine-readable storage medium of claim 8, wherein the first position comprises an edge portion of the GUI and a second position comprises the edge portion and a center portion of the GUI.

15. A system comprising:
a memory; and
a processor, operatively coupled to the memory, to:
execute a notification system as a component of an operating system (OS), the notification system is to receive a plurality of message types from a plurality of applications of different types executed by the processor and is to transmit notifications to a message tray on a graphical user interface (GUI) of the OS;
receive a first message type of the plurality of message types at the notification system, the first message type comprising a first email message generated by an email application of the plurality of applications;
display, via the notification system in the GUI, a notification having a portion of information of the first email message without launching a separate process of the email application and without invoking a user interface of the email application, the notification displayed in a message tray of the GUI at a first position;
in response to a first signal indicating that a cursor is within a first distance of the notification:
increase a size of the message tray in the GUI; and
display, via the notification system, further information of the first email message and an input field in the message tray having the increased size without launching the separate process of the email application and without invoking the user interface of the email application;
receive a second message entered into the input field of the message tray having the increased size by the user;
forward, via the notification system, the second message for transmission of the second message without invoking the user interface of the email application;
in response to a second signal indicating that the cursor is within the first distance of the message tray for a first predetermined time interval:
display, in the message tray having the increased size, a plurality of other email messages provided to the notification system by the email application, wherein each of the plurality of other email messages are different from the first email message and the second message and are displayed in the message tray without launching the separate process of the email application and without invoking the user interface of the email application, and wherein the one or more other email messages comprise most recently received email messages of the email application;
responsive to a third signal indicating that the cursor is directly over one of the email messages, display one or more action buttons corresponding to the one of the email messages, the one or more action buttons comprising at least a delete button; and
responsive to a fourth signal indicating selection of the delete button, cause the email application to delete the one of the email messages; and
in response to a fifth signal indicating that the cursor is beyond the first distance, decrease the size of the message tray.

16. The system of claim 15, wherein the first email message and the input field are displayed in the GUI in a semi-transparent style on a foreground of the GUI.

17. The system of claim 15, wherein the processor is further to:
remove the first email message from a display of the GUI when the cursor has not been detected within a second predetermined time interval; and
display an icon on the message tray of the GUI, wherein the icon is displayed in a style to indicate that there is a pending message to be viewed.

18. The system of claim 17, wherein the processor is further to, in response to an activation of the icon, display the first email message within a second distance of the icon without using a separate window or process, including the input field to allow the user to respond to the first email message.

19. The system of claim 17, wherein the processor is further to transmit the pending message to a message source, wherein the message source is one of a plurality message sources, wherein for each of the message sources having the pending message to be viewed, an icon associated with the corresponding message source is displayed on the message tray, which when activated from the message tray, the corresponding pending message is displayed.

20. The system of claim 15, wherein the first position comprises an edge portion of the GUI and a second position comprises the edge portion and a center portion of the GUI.

* * * * *